United States Patent
Wei et al.

(10) Patent No.: US 11,435,037 B2
(45) Date of Patent: Sep. 6, 2022

(54) COUPLING LIGHT SOURCE TO PHOTONIC INTEGRATED CIRCUIT

(71) Applicant: Meta Platforms Technologies, LLC, Menlo Park, CA (US)

(72) Inventors: Guohua Wei, Redmond, WA (US); Maik Andre Scheller, Redmond, WA (US); Karol Constantine Hatzilias, Kenmore, WA (US); Christopher Yuan-Ting Liao, Seattle, WA (US); Qi Zhang, Kirkland, WA (US); Joseph S. Corry, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/007,308

(22) Filed: Aug. 31, 2020

(65) Prior Publication Data
US 2022/0065407 A1     Mar. 3, 2022

(51) Int. Cl.
F21K 9/61    (2016.01)
F21K 9/69    (2016.01)
G02B 1/118    (2015.01)
F21V 8/00    (2006.01)

(52) U.S. Cl.
CPC ............ *F21K 9/61* (2016.08); *F21K 9/69* (2016.08); *G02B 1/118* (2013.01); *G02B 6/005* (2013.01); *G02B 6/0058* (2013.01); *G02B 6/0065* (2013.01)

(58) Field of Classification Search
CPC .. F21K 9/61; F21K 9/69; G02B 1/118; G02B 6/005; G02B 6/0058; G02B 6/0065
See application file for complete search history.

(56) References Cited

U.S. PATENT DOCUMENTS

2010/0321781 A1    12/2010    Levola et al.
2020/0049882 A1    2/2020    Wang et al.

FOREIGN PATENT DOCUMENTS

EP            3173833 A1    5/2017

OTHER PUBLICATIONS

Haglund, Erik et al., High-Power single transverse and polarization mode VCSEL forsilcon photonics integration; Optics Express, vol. 27, No. 13, Jun. 24, 2019, 8 pages.
International Search report and Written Opinion for International Application No. PCT/US2021/044079, dated Nov. 8, 2021, 14 pages.

*Primary Examiner* — Mary Ellen Bowman
(74) *Attorney, Agent, or Firm* — Freestone Intellectual Property Law PLLC; Aaron J. Visbeek; Andrew J. Cameron

(57) ABSTRACT

A device or system includes a light source, an optical waveguide, and a light director. The light source emits illumination light. The optical waveguide includes a light input coupler. The light director receive the illumination light and generates shaped light. The light director adjusts the tilt angle and/or the divergence angle of the illumination light.

19 Claims, 18 Drawing Sheets

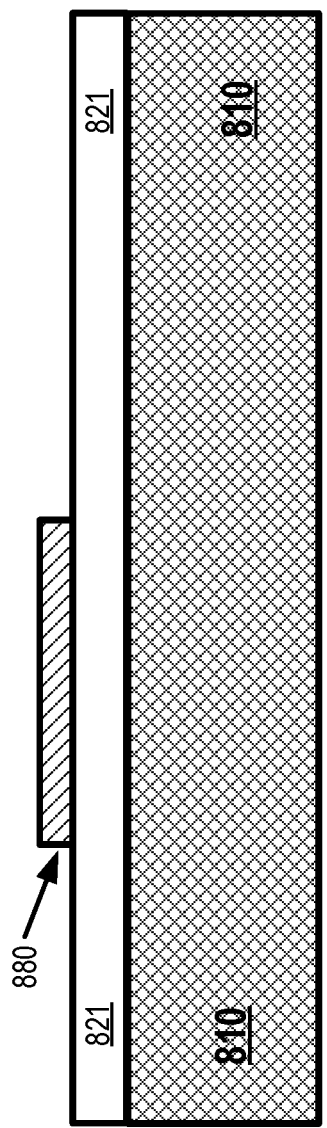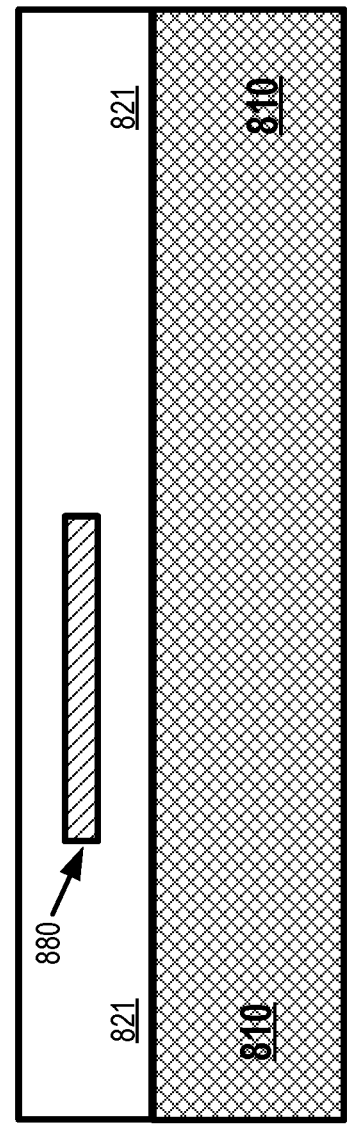

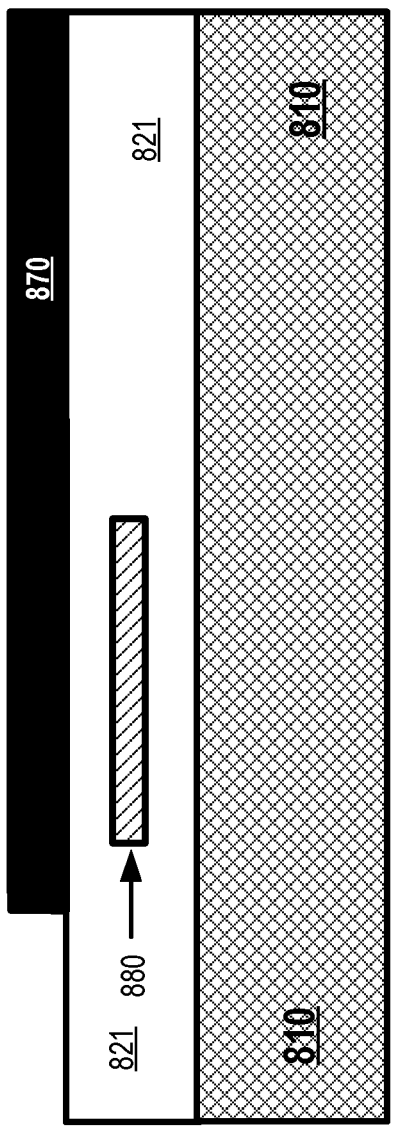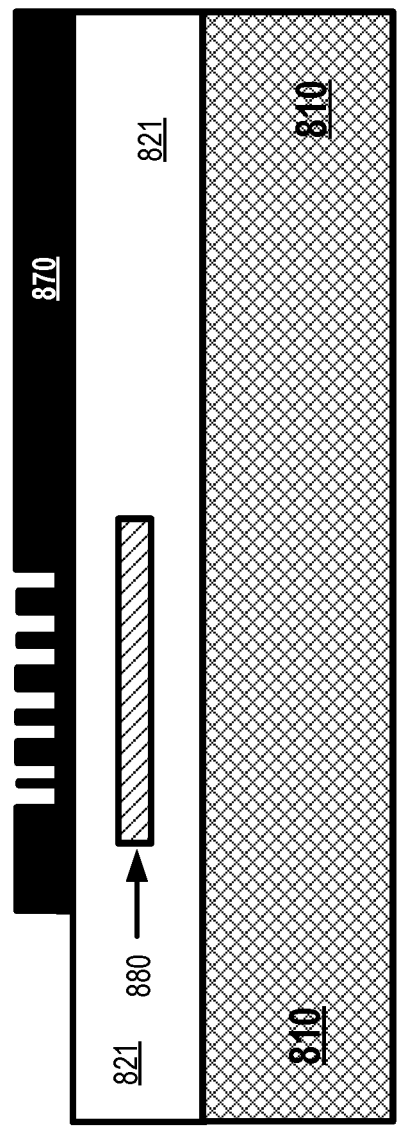

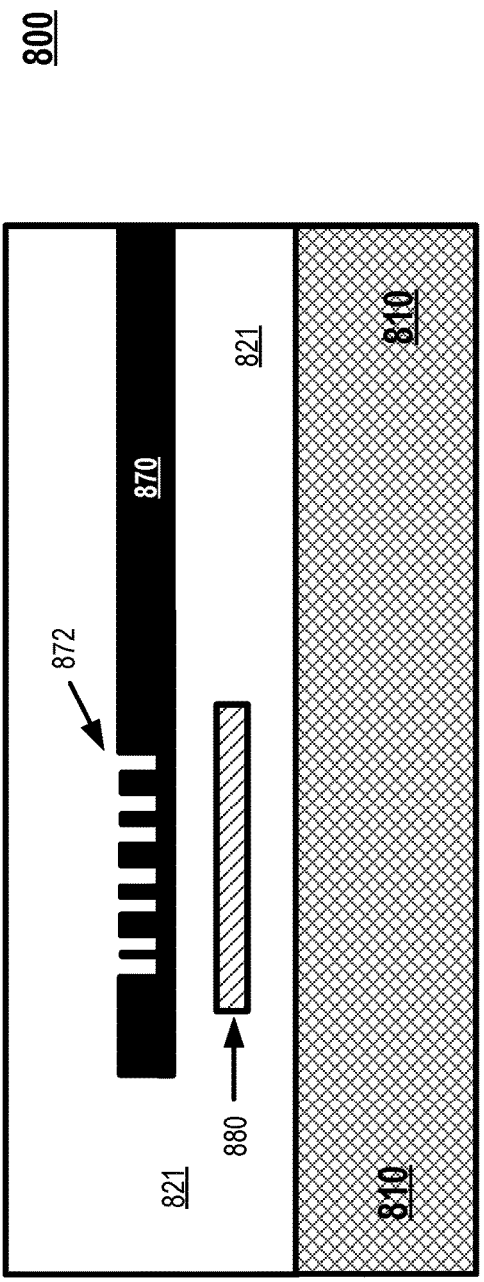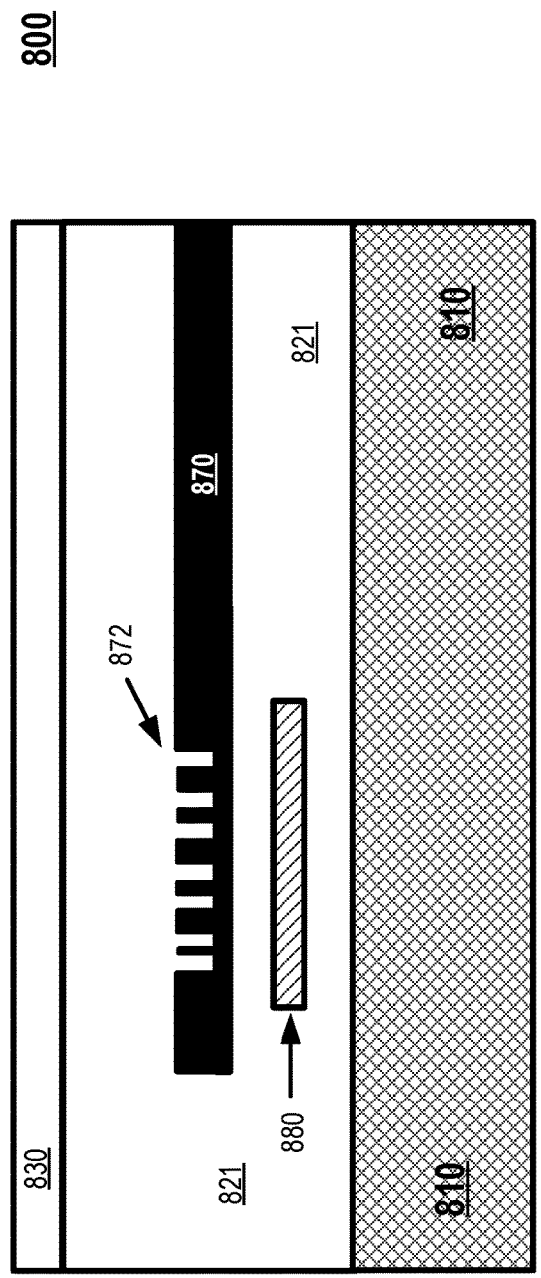
FIG. 8G
FIG. 8H

COUPLING LIGHT SOURCE TO PHOTONIC INTEGRATED CIRCUIT

TECHNICAL FIELD

This disclosure relates generally to optics, and in particular to optical coupling of light sources.

BACKGROUND INFORMATION

Photonic systems which are sometimes referred to as photonic integrated circuits (PICs) typically include routing light emitted from light sources. Various photonic systems may include optical modulators, photodetectors, waveguides, and one or more light sources, for example. Cost, size, and/or efficiency improvements to photonic systems are desirable.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIGS. 8A-8K illustrate an example fabrication process of an optical structure that increases light incoupling efficiency, in accordance with aspects of the disclosure.

DETAILED DESCRIPTION

Figure 1A:
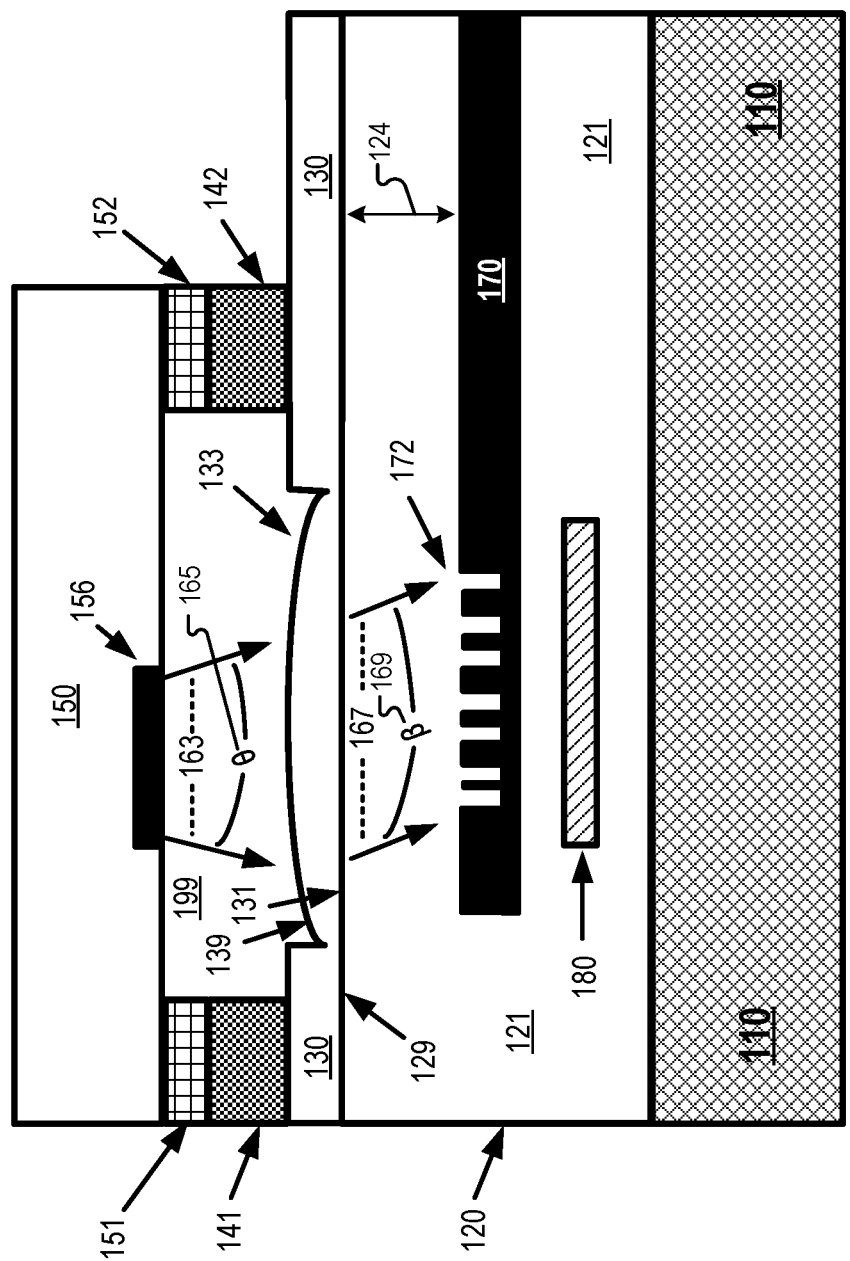
FIG. 1A illustrates a portion of a device that includes a light director shaping illumination light from a light source for increased optical coupling efficiency into a waveguide, in accordance with aspects of the disclosure.

Embodiments of photonic systems are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 µm.

In aspects of this disclosure, the term "transparent" may be defined as having greater than 90% transmission of light. In some aspects, the term "transparent" may be defined as a material having greater than 90% transmission of visible light. In some aspects, the term "transparent" may be defined as a material having greater than 90% transmission of infrared light.

The devices, substrates, and systems that are described in this disclosure are directed to increasing the coupling efficiency of light sources to photonic systems such as photonic integrated circuits (PICs). The devices described in this disclosure may also reduce the cost, size, and/or fabrication complexities associated with PICs.

Prior techniques for coupling light sources to waveguides include illuminating an input coupler (e.g. a grating) of a waveguide with illumination light from the light source. Since it generally increases the efficiency of the input coupler to tilt the illumination light, light sources such as LEDs and vertical-cavity side-emitting lasers (VCSELs) are soldered to electrical traces at an angle. However, since the resulting angle of the light source relies on the size of the solder ball, the time it takes for the solder to stabilize, and the angle accuracy ability of pick-and-place machines, the existing techniques do not provide consistent tilt angles for light coupling efficiency. The prior techniques may also require an additional wire-bond technique to electrically couple a second electrical contact (e.g. anode or cathode) of the light source to power the light source since one contact will be on the bottom of the light source to induce the spacing from the solder (to achieve the tilt angle) and the other contact will likely be on the top of the light source that requires a wire-bond process. In some contexts, it would be preferable for both the electrical contacts of the light source to be electrically coupled to electrical traces in the same fabrication process step (e.g. solder reflow).

Another issue in some prior arrangements is non-optimal divergence angles of light sources. For example light sources may have a divergence angle of up to 180 degrees. Many light sources have a Lambertian or Lambertian-esque divergence angles, for example. However, for better light coupling efficiency to an input coupler of a waveguide, the divergence angle of the illumination light from the light source would ideally be reduced.

In example of this disclosure, a light director (e.g. microlens or metalens such as a diffractive optical element) receives illumination light from the light source and shapes the illumination light to increase the efficiency of light that is incoupled into a waveguide. For example, the tilt angle of the illumination light may be adjusted to increase the input coupling efficiency. The tilt angle may be adjusted to between three and ten degrees, for example. The divergence angle of the illumination light may also be reduced by the light director. The divergence angle is reduced to approximately five degrees, in an example embodiment. The reduced divergence angle of the illumination light from the light source may be considered collimated light or near-collimated light in some examples. The light director may allow the light source (e.g. LED or VCSEL) to be mounted flat and allow the light source to be coupled to the photonic systems using conventional fabrication processing techniques. These and other embodiments are described in more detail in connection with FIGS. 1A-10.

FIG. 1A illustrates a portion of a device 100 that includes a light director shaping illumination light from a light source 150 for increased optical coupling efficiency into waveguide 170, in accordance with aspects of the disclosure. Light source 150 includes emission aperture 156 and electrical contacts 151 and 152. Electrical contact 151 may be an anode of the light source 150 and electrical contact 152 may be a cathode of the light source 150, for example. Light source 150 may be an LED or a VCSEL. Light source 150 may be configured to emit visible light or non-visible light (including infrared light). Light source 150 may be configured to emit near-infrared light, in some aspects. In FIG. 1A, light source 150 is a top-emitting light source with coplanar electrical contacts on the same side of the emissions aperture.

Light source 150 is electrically coupled to device 100 by electrical traces (or electrical pads) 141 and 142. In the illustration of FIG. 1A, electrical contact 151 is electrically coupled to trace/pad 141 and electrical contact 152 is electrically coupled to trace/pad 142. In other embodiments (not illustrated) traces 141 and 142 may be disposed on an additional spacing layer to space light source 150 from light director layer 130. In the illustration of FIG. 1A, light director layer 130 includes a refractive microlens 133 as the light director. Refractive microlens 133 may have a width of approximately twenty microns and a height of one micron. Refractive microlens 133 may have a spherical, aspherical, or freeform lensing surface 139 that provides optical power. In an example, the curvature of a spherical lens 139 has a radius of 80 microns. The entire light director layer 130 may be made from a refractive material such as amorphous silicon (a-Si), for example. The amorphous silicon may have a refractive index of approximately 3.5 at near infrared wavelength range for example. Microlens 133 may be formed of SiN, in an embodiment. In other embodiments (described below), the light director may be a metalens rather than a refractive microlens. For example, the light director may be a diffractive optical element (DOE), holographic light director, or otherwise. A metalens has a planar metasurface. The metasurface may have nanostructures in a periodic or non-periodic form such as an array of nano-pillars. The nano-pillar may have different diameters and a same height.

The illustrated microlens 133 includes an input side 139 that receives illumination light 163 and an output side 131. Input side 139 has a curvature with optical power while output side 131 is planar, in the illustration of FIG. 1A. Output side 131 is coupled with a planar side 129 of cladding layer 121 of waveguide layer 120. An anti-reflection (AR) coating may be disposed on input side 139 and/or output side 131 to increase optical efficiency by decreasing undesirable reflections. The AR coating may be a multi-layer dielectric coating tuned to the specific wavelength of illumination light 163, for example. Silicon-nitride (SiN) may be utilized as an AR dielectric coating, in an embodiment.

Microlens 133 is disposed between light source 150 and waveguide layer 120. Waveguide layer 120 includes waveguide 170. Waveguide 170 includes light input coupler 172. Light input coupler 172 is included in waveguide 170. Light input coupler 172 is a grating that is formed of the waveguide material 170, in FIG. 1A. In an example, light input coupler 172 is a grating formed of nano-pillars of a refractive waveguide material 170. The nano-pillars may be formed by CMOS processes such as etching, masking, polishing, lithography, and/or vapor deposition, for example. A grating 172 is configured to incouple a particular wavelength of light into waveguide 170. Therefore, grating 172 may be configured to specifically incouple the wavelength of light emitted by light source 150. In the illustration of FIG. 1A, waveguide 170 is immersed in a cladding layer 121 to confine waveguide light propagating in waveguide 170. Cladding layer 121 may have a lower index of refraction than waveguide material 170. Cladding layer 121 may have a refractive index of approximately 1.45 and waveguide material 170 may have a refractive index of approximately 2.5. Cladding layer 121 may include silicon-oxide ($SiO_2$) and waveguide material 170 may be formed of silicon rich silicon-nitride, for example.

Optionally, waveguide layer 120 may include a reflector 180. Reflector 180 is configured to increase optical efficiency by reflecting light that passes through the light input coupler 172 back to light input coupler 172 for a second chance (or more) of incoupling the light into waveguide 170. Light input coupler 172 is disposed between the reflector 180 and the light director (microlens 133 in FIG. 1A). Reflector 180 may be a metal layer or a diffractive reflector such as a distributed bragg reflector (DBR), for example. In an embodiment where reflector 180 is a diffractive reflector layer, the diffractive reflective layer may be specifically configured to reflect a near-infrared wavelength band of the illumination light (emitted by light source 150) back to the light input coupler 172 and configured to transmit light outside of the near-infrared wavelength band. The near-infrared wavelength band may have a linewidth of five nanometers or less. In the illustration of FIG. 1A, waveguide layer 120 is disposed over a substrate layer 110. Substrate layer 110 may be considered a wafer in some contexts. Void 199 disposed between aperture 156 and microlens 133 may be an air gap or filled with materials suitable for antireflection coating purposes both for the microlens 133 and the light source 150.

In operation, light source 150 illuminates the light director (microlens 133 in FIG. 1A) with illumination light 163. In FIG. 1C, the light director is a metalens 193. The light director is configured to receive illumination light 163 and configured to direct illumination light 163 to light input coupler 172 as shaped light 167. The light director is configured to tilt illumination light 163 to give shaped light 167 a tilt angle with respect to the light input coupler 172. A dimension 124 between waveguide 170 and planar side 129 may be dimensioned with a depth of cladding layer 121 to optimize the illumination of light input coupler 172 with shaped light 167.

Figure 1B:
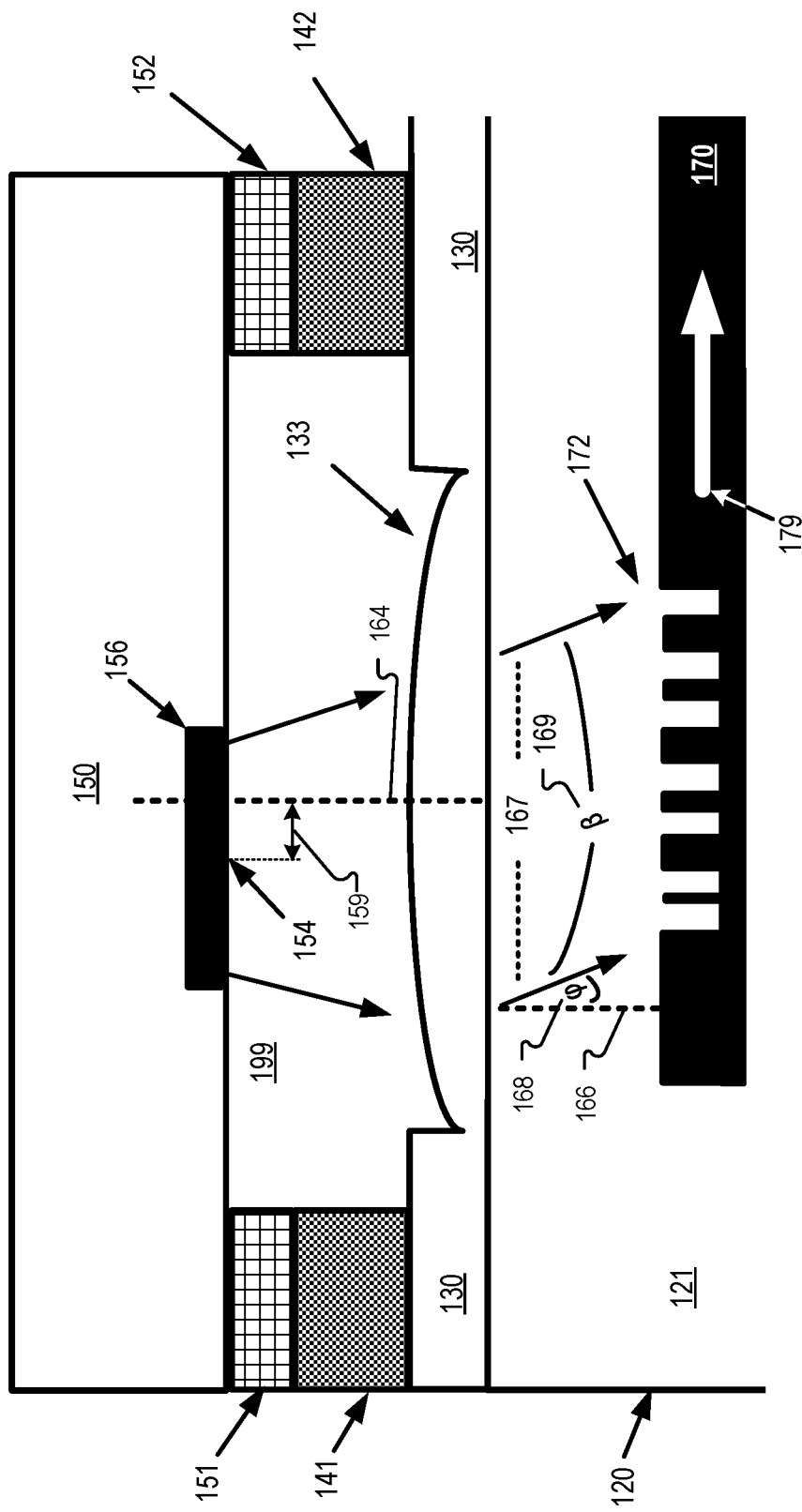
FIG. 1B illustrates a tilt angle with respect to a vector orthogonal to a plane of a waveguide, in accordance with aspects of the disclosure.
Figure 1C:
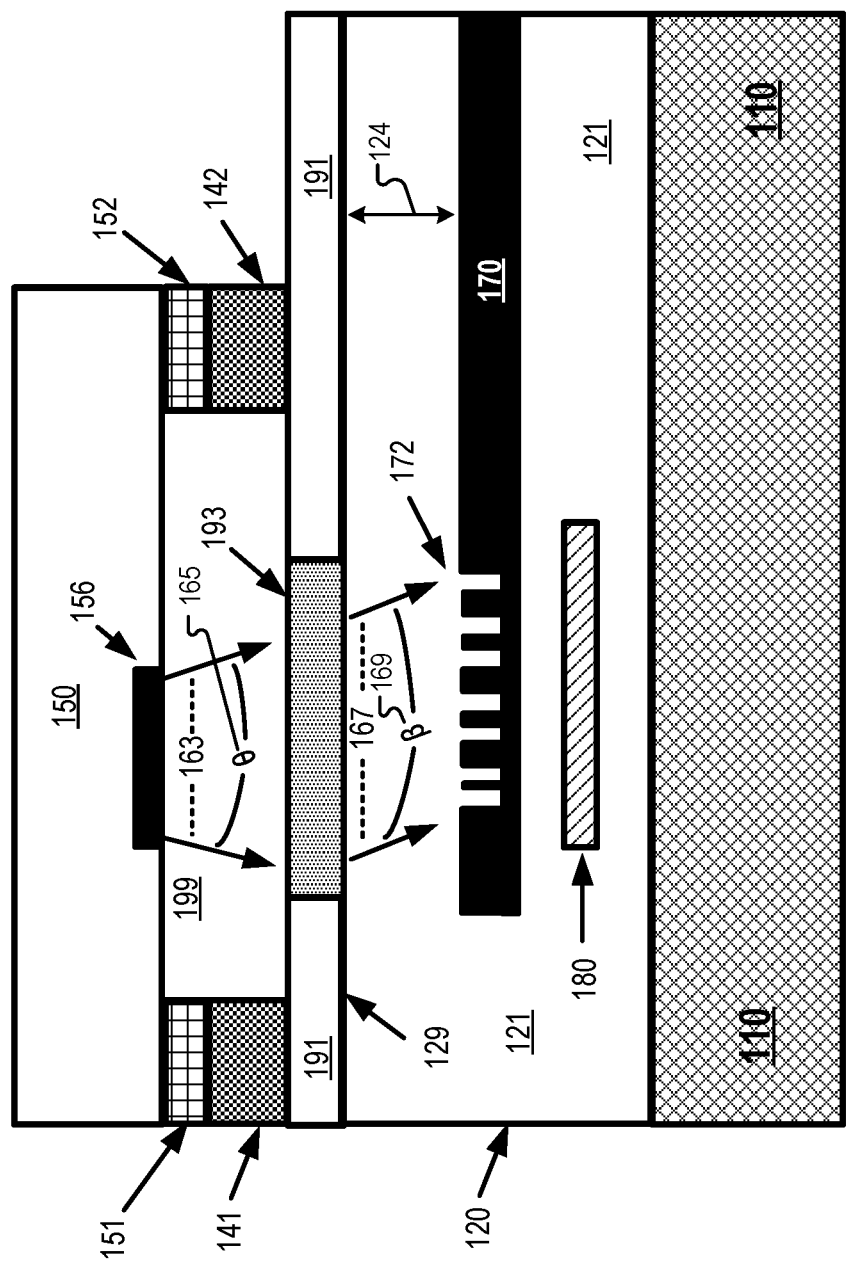
FIG. 1C illustrates a metalens as a light director for shaping illumination light, in accordance with aspects of the disclosure.

FIG. 1B illustrates tilt angle φ 168 can be measured with respect to a vector 166 orthogonal to a plane of the waveguide 170. As a result, shaped light 167 is incident upon light input coupler 172 at a tilt angle φ 168 to increase the intensity of waveguide light 179 that is incoupled by light input coupler 172 to propagate along waveguide 170. Tilt angle φ 168 may be between three degrees and fifteen degrees. Tilt angle φ 168 may be between three degrees and ten degrees. Tilt angle φ 168 may be between five degrees and seven degrees, in some embodiments.

A middle 154 of emission aperture 156 may be offset by dimension 159 from a central optical axis 164 of refractive microlens 133 to impart the tilt angle φ 168 of the shaped light 167. In one embodiment, dimension 159 is between four microns and eight microns.

Referring back to FIG. 1A, a light director (e.g. microlens 133 or metalens 193) may also be configured to give shaped light 167 a smaller divergence angle β 169 than an illumination light divergence angle θ 165 of illumination light 163. For example, illumination light divergence angle θ 165 of illumination light 163 may be 15 degrees or more. When microlens 133 is the light director as in FIG. 1A, microlens 133 may provide a divergence angle β 169 to shaped light 167 that is between four degrees and seven degrees. In an embodiment, microlens 133 may provide a divergence angle β 169 to shaped light 167 that is less than ten degrees. In one example, divergence angle β 169 is five degrees. Divergence angle β 169 may be less than four degrees. Divergence angle β 169 may be considered collimated or near-collimated light, in some embodiments.

Therefore, the light director may shape illumination light 163 into shaped light 167 by imparting a tilt angle φ 168 and/or reduce illumination light divergence angle θ 165. In one example, tilt angle φ 168 is approximately (within 1 degree of) five degrees and illumination light divergence angle θ 165 is approximately five degrees, for example. Shaping the illumination light 163 with a light director in one or both ways increases the optical efficiency of light input coupler 172.

FIG. 1C illustrates a device 101 where the light director is a metalens (such as a diffractive element) rather than a refractive microlens, in accordance with aspects of the disclosure. Metalens 193 is included in light director layer 191 and may accomplish the same beam-shaping characteristics as described with respect to FIG. 1A and microlens 133. Metalens 193 may be a diffractive optical element (DOE), holographic light director, or otherwise. Metalens 193 may be a planar surface made of silicon-nitride, amorphous-silicon, titanium-oxide (TiO$_2$), or other suitable materials. Metalens 193 may be formed of nano-pillars having a same height but different diameters to keep metalens 193 a planar layer. While additional embodiments of this disclosure are illustrated with a refractive microlens as the light director, it is understood by those skilled in the art that the microlenses illustrated in this disclosure may be replace by metalenses that achieve the same optical characteristics as the microlenses. Therefore, those skilled in the art appreciate that the embodiments illustrated in FIGS. 2-8 may instead include metalenses achieving the same optical functionality as the illustrated microlenses.

Figure 2:
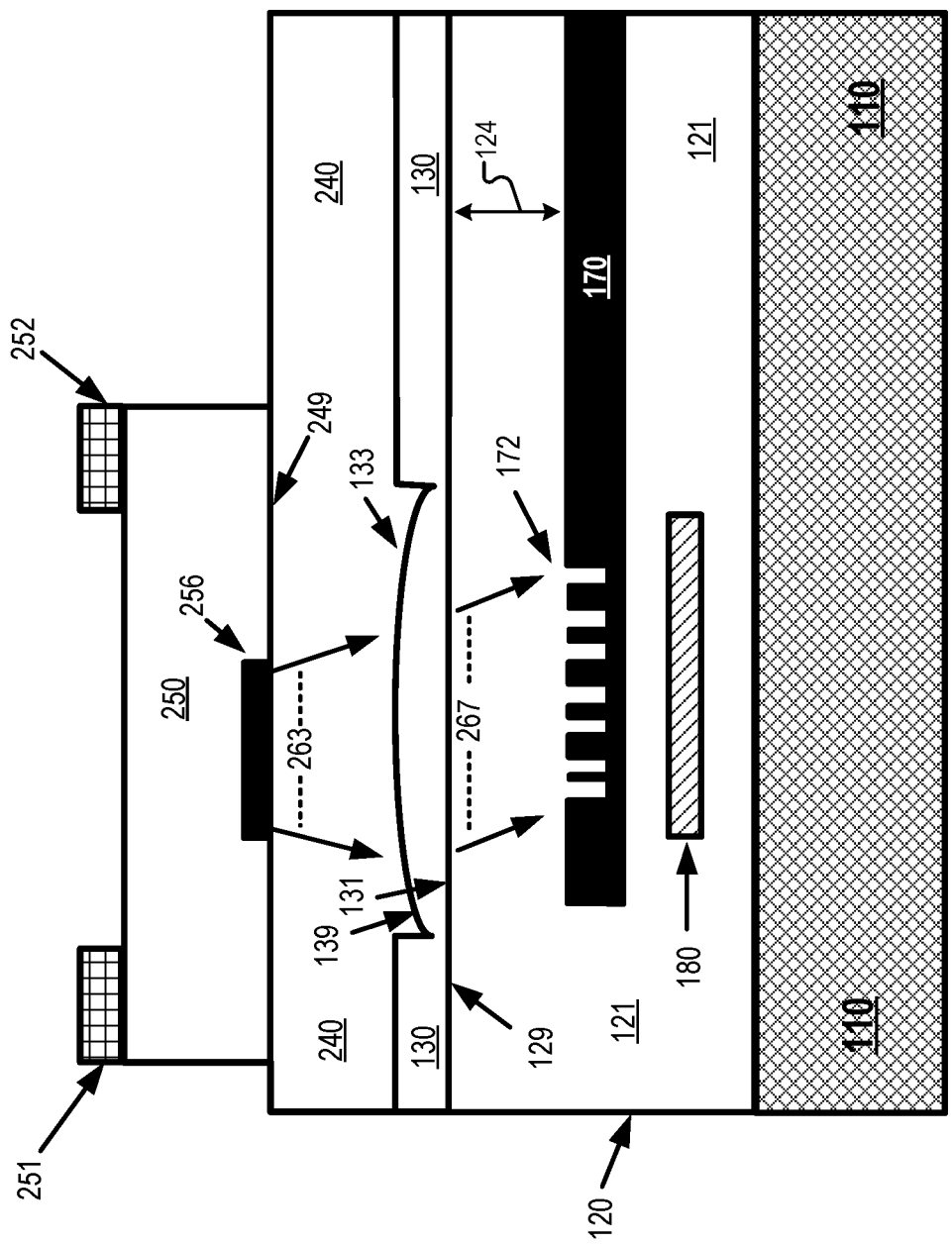
FIG. 2 illustrates a device that includes a bottom-emitting light source, a refractive spacing layer, and a microlens for shaping illumination light into shaped light incident on a light input grating, in accordance with aspects of the disclosure.

FIG. 2 illustrates a device 200 that includes a bottom-emitting light source 250, a refractive spacing layer 240, and a microlens 133 for shaping illumination light 263 into shaped light 267 incident on light input grating 172, in accordance with aspects of the disclosure. Bottom-emitting light source 250 has emission aperture 256 disposed on a bottom side or the wafer of light source 250. Traces, pads, or wire-bonds (not illustrated) may be electrically coupled to electrical contacts 251 and 252 to provide electrical power to light source 250 to generate illumination light 263. Electrical contacts 251 and 252 may be coupled to the cathode and anode of light source 250, respectively.

In device 200, refractive spacing layer 240 spaces emission aperture 256 from microlens 133. Refractive spacing layer 240 may be made of an optical polymer or silicon-oxide, for example. Refractive spacing layer 240 is disposed between the light director (microlens 133 in FIG. 2) and light source 250. Additionally, refractive spacing layer 240 may provide a top plane 249 offering a planar surface of refractive spacing layer 240 to place light source 250. This planar surface assists in increasing the consistency of the placement of light source 250 with respect to microlens 133 and light input coupler 172, which in turn, increases the light coupling efficiency of the optical system. Top plane 249 of the refractive spacing layer 240 may be parallel to emission aperture 256 of light source 250.

In operation, light source 250 illuminates the light director (microlens 133 in FIG. 2) with illumination light 263. Illumination light 263 propagates through the refractive spacing layer 240 to become incident on microlens 133. Microlens 133 is configured to receive illumination light 263 and configured to direct illumination light 263 to light input coupler 172 as shaped light 267. Microlens 133 is configured to tilt illumination light 263 to give shaped light 267 a tilt angle with respect to the light input coupler 172. Shaped light 267 may include the optical characteristics of shaped light 167 described with respect to FIGS. 1A-1C.

Figure 3:
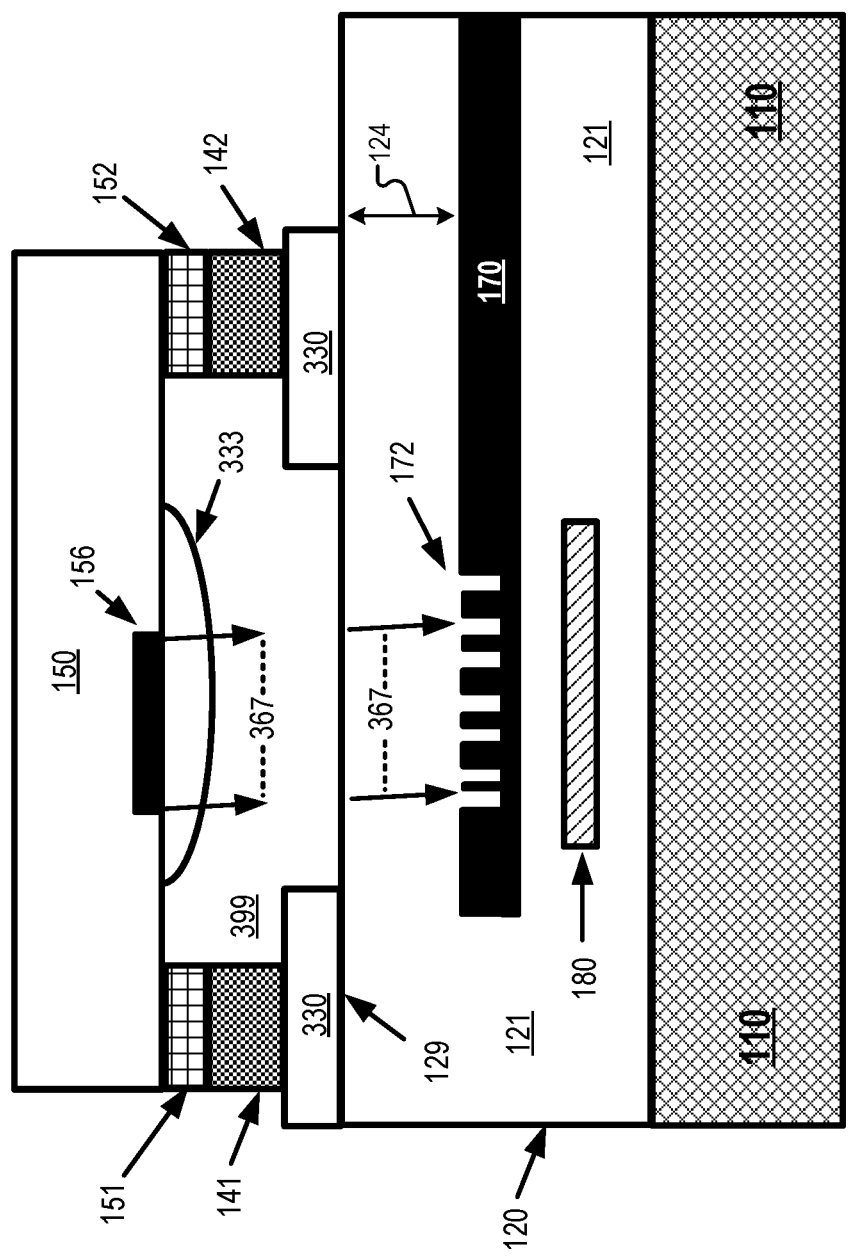
FIG. 3 illustrates a device that includes a light source and a microlens coupled with an emission aperture of the light source, in accordance with aspects of the disclosure.

FIG. 3 illustrates a device 300 that includes light source 150 and a microlens 333 coupled with an emission aperture 156 of light source 150, in accordance with aspects of the disclosure. In FIG. 3, microlens 333 is configured to give shaped light 367 a smaller divergence angle than would be emitted in the illumination light from aperture 156 of light source 150 if microlens 333 was not coupled with (e.g. disposed over) emission aperture 156. For example, the illumination light of light source 150 would include the characteristics of illumination light 163 if microlens 333 was not coupled with emission aperture 156. The illumination light propagates through microlens 333 and exits microlens 333 as shaped light 367. An AR coating may be disposed on microlens 333 and/or a planar side 129 of cladding layer 121. In addition to reducing the divergence angle of the illumination light, microlens 133 may also provide a tilt angle to shaped light 367. For example, if emission aperture 156 of the light source 150 is offset from a central optical axis of the refractive microlens 333, microlens 333 may also impart a tilt angle to shaped light 367. The tilt angle may have the characteristics described with respect to tilt angle φ 168 and the divergence angle of shaped light 367 may have the same characteristics described with respect to divergence angle β 169.

In operation, light source 150 illuminates the light director (microlens 333 in FIG. 3) with illumination light. Microlens 333 is configured to receive the illumination light and configured to direct the illumination light to light input coupler 172 as shaped light 367. Shaped light 367 propagates through void 399 and through cladding layer 121 to become incident on light input coupler 172. Void 399 may be an air gap or filled with an index-matching optical material. Index-matching materials may be matched to layer 121. If microlens 333 has a similar refractive index to layer 121, then void 399 may have a refractive index lower than microlens 333. Shaped light 367 may include the optical characteristics of shaped light 167 described with respect to FIGS. 1A-1C.

Figure 4:
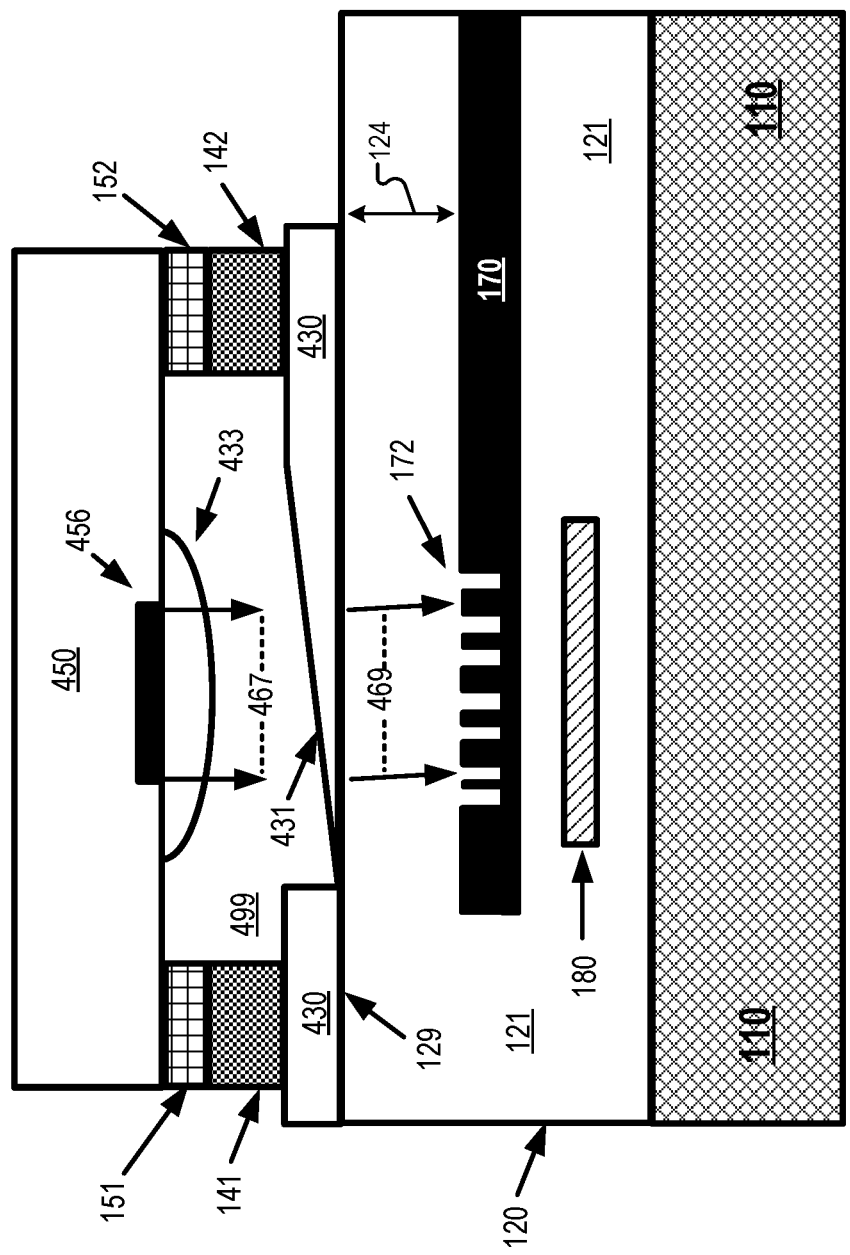
FIG. 4 illustrates a device that includes a refractive wedge optic configured to impart a tilt angle to incident light, in accordance with aspects of the disclosure.

FIG. 4 illustrates a device 400 that includes a refractive wedge optic 431 configured to impart a tilt angle to incident light, in accordance with aspects of the disclosure. FIG. 4 includes light source 450 having an emission aperture 456 that emits illumination light that illuminates microlens 433. Microlens 433 is coupled with emission aperture 456 of light source 450. A central optical axis of microlens 433 may be aligned with a center or middle of emission aperture 456. Light source 450 may include the features described with respect to light source 150. In FIG. 4, microlens 433 is configured to give shaped light 467 a smaller divergence angle than would be emitted in the illumination light from aperture 456 of light source 150 if microlens 433 was not coupled with (e.g. disposed over) emission aperture 156. The illumination light propagates through microlens 433 and exits microlens 433 as shaped light 467. Shaped light 467 propagates through void 499 before becoming incident on refractive wedge optic 431. Void 499 may be filled with an index-matching optical material or be an airgap.

After propagating through void 499, shaped light 467 encounters refractive wedge optic 431 of refractive layer 430. Wedge optic 431 is configured to impart a tilt angle to shaped light 467 to generated re-shaped light 469. The tilt angle of re-shaped light 469 may have the characteristics described with respect to tilt angle ϕ 168 and the reduced divergence angle imparted to shaped light 467 may have the same characteristics described with respect to divergence angle β 169. An AR coating may be disposed on refractive wedge optic 431. Refractive layer 430 may include amorphous silicon or other refractive material. In some embodiments, the tilt angle and/or divergence angle of illumination light is adjusted by optical modifications of the light source in combination with a light director also adjusting the divergence angle and/or tilt angle of the illumination light so that the beam shaping is split between the light source and the light director.

Figure 5:
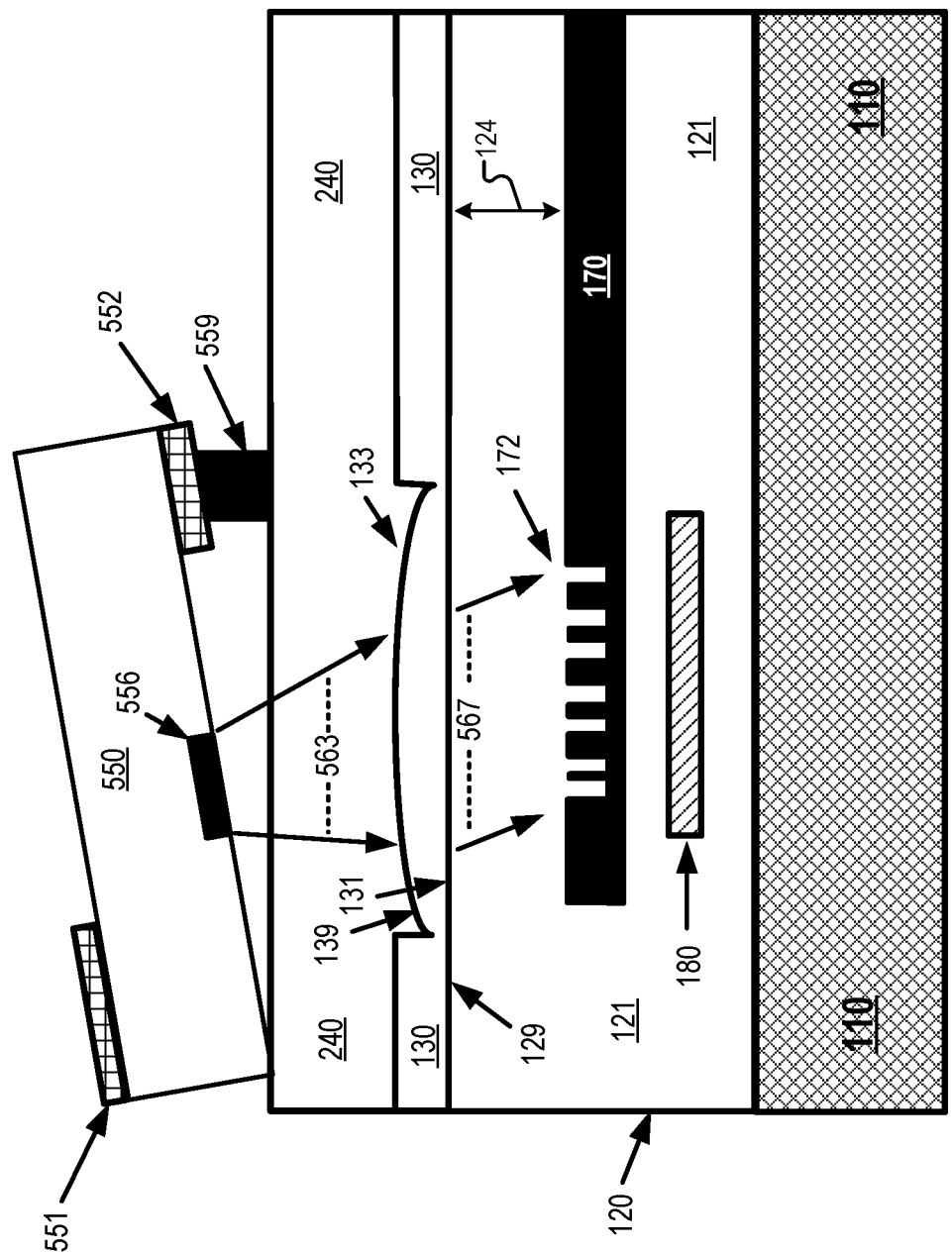
FIG. 5 illustrates a device including a tilt spacer to provide a tilt angle to illumination light emitted by a light source, in accordance with aspects of the disclosure.

FIG. 5 illustrates a device 500 including a tilt spacer 559 to provide a tilt angle to illumination light emitted by light source 550, in accordance with aspects of the disclosure. Light source 550 may be an LED or a VCSEL. Light source 550 may be a non-visible light source or a visible light source. Light source 550 may be an infrared light source or a near-infrared light source. Light source 550 is not a flip-chip light source and has electrical contact 551 on an opposite side of light source 550 as electrical contact 552. Tilt spacer 559 props up electrical contact 552 and tilts light source 550. As a result, emission aperture 556 of light source 550 is also tilted with respect to a plane of optical waveguide 170 and light input coupler 172. Tilt spacer 559 provides sufficient tilt to give illumination light 563 a tilt angle that will increase the optical coupling efficiency of light input coupler 172. In some embodiments, tilt spacer 559 may be an electrical trace to provide power to light source 550 and include copper or other conductive metal. Electrical contact 552 may be electrically coupled to tilt spacer 559. Tilt spacer 559 may have a height of approximately 10 to 20 microns, in some contexts, to achieve a tilt angle for light source 550 of five to eight degrees. Tilt spacer 559 may be formed of polymer or $SiO_2$.

Microlens 133 (or a metalens 193) acts as a light director configured to receive the illumination light 563 (already having a tilt angle) and direct the illumination light 563 to light input coupler 172 as shaped light 567. Microlens 133 is configured to give shaped light 567 a smaller divergence angle than an illumination light divergence angle of illumination light 563. In FIG. 5, tilt spacer 559 provides the tilt angle and microlens 133 provides the reduction of the divergence angle so that shaped light 567 is more efficiently coupled into waveguide 170 by light input coupler 172. In contrast, for FIG. 4, microlens 433 reduces the divergence angle and refractive wedge optic 431 provides the tilt angle so that re-shaped light 469 is more efficiently coupled into waveguide 170 by light input coupler 172.

Figure 6:
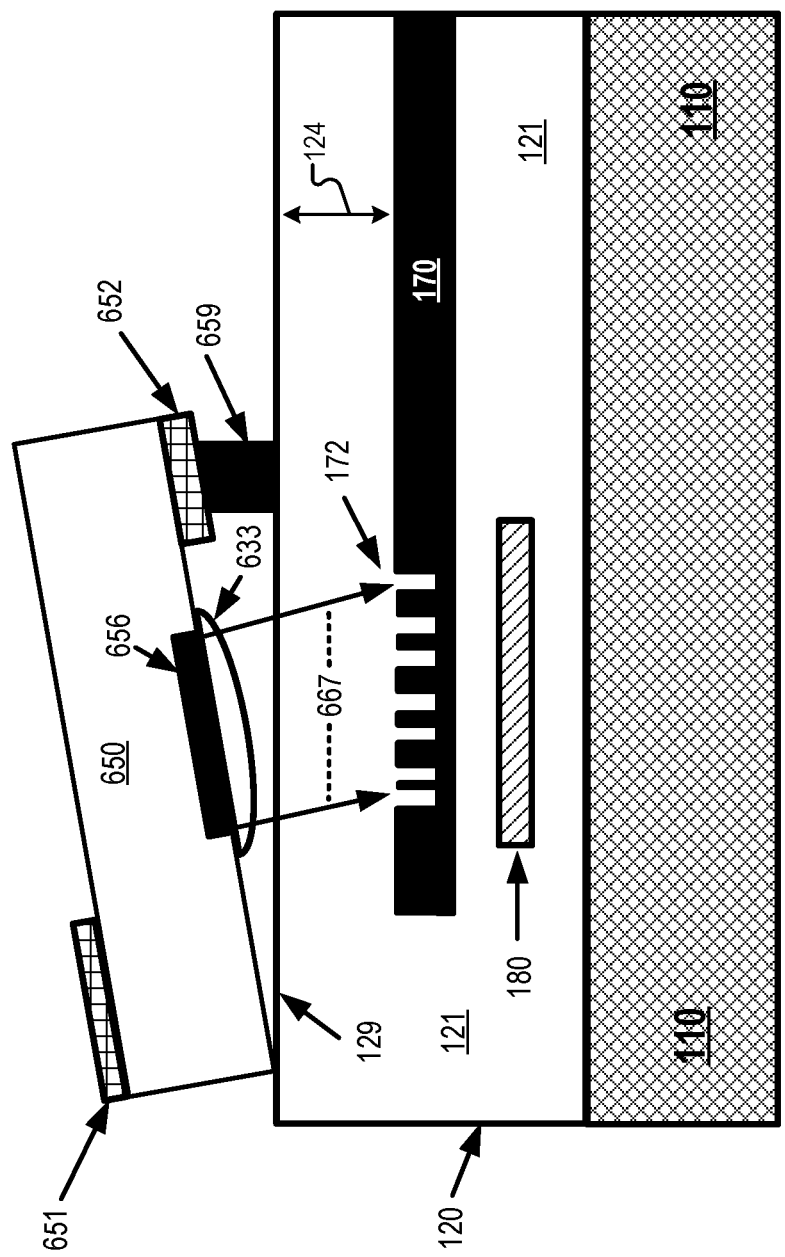
FIG. 6 illustrates a device including a tilt spacer to provide a tilt angle to illumination light and a microlens providing a reduced divergence angle, in accordance with aspects of the disclosure.

FIG. 6 illustrates a device 600 including a tilt spacer 659 to provide a tilt angle to illumination light and a microlens 633 providing a reduced divergence angle, in accordance with aspects of the disclosure. Light source 650 and may include the features described with respect to light source 150 or light source 550. Electrical contacts 651 and 652 may have the features of electrical contacts 551 and 552. In FIG. 6, tilt spacer 659 props up electrical contact 652 and tilts light source 650. As a result, emission aperture 656 of light source 650 is also tilted with respect to a plane of optical waveguide 170 and light input coupler 172. Tilt spacer 659 provides sufficient tilt to give the illumination light outputted by emission aperture 656 a tilt angle that will increase the optical coupling efficiency of light input coupler 172. Microlens 633 coupled with the emission aperture 656 of light source 650 reduces the divergence angle of the illumination light from light source 650 so that shaped light 667 has a reduced divergence angle. Consequently, tilt spacer 659 provides the tilt angle and microlens 633 provides the reduced divergence angle so that shaped light 667 has the optical characteristics described above to increase optical coupling efficiency to incouple shaped light 667 into optical waveguide 170 via light input coupler 172.

In operation, light source 650 illuminates the light director (microlens 633 in FIG. 6) with illumination light. Microlens 633 is configured to receive the illumination light and configured to direct the illumination light to light input coupler 172 as shaped light 667. Shaped light 667 propagates through cladding layer 121 to become incident on light input coupler 172. Shaped light 667 may include the optical characteristics of shaped light 167 described with respect to FIGS. 1A-1C.

Figure 7:
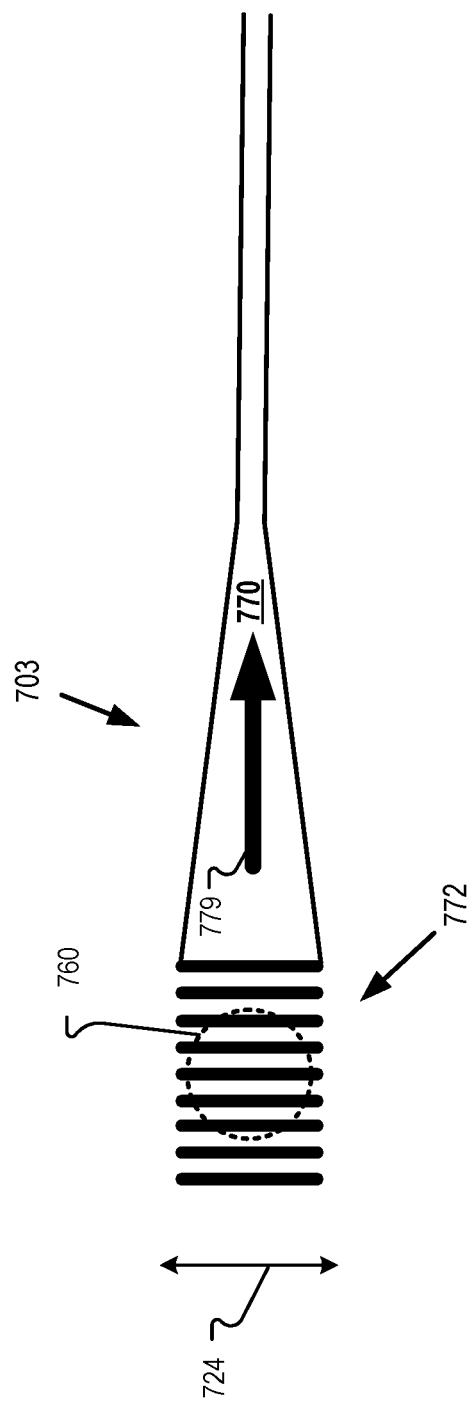
FIG. 7 illustrates a top-down view of a tapered waveguide having a grating coupler, in accordance with aspects of the disclosure.

FIG. 7 illustrates a top-down view of a tapered waveguide 770 having a grating coupler 772, in accordance with aspects of the disclosure. Tapered waveguide 170 may be used as waveguide 170, for example. Tapered waveguide 770 includes a grating coupler 772 configured to incouple a particular wavelength of light that is matched to a light source such as light source 150. For example, shaped light 167 may be incident on aperture 760 of grating coupler 772 and grating coupler 772 incouples the shaped light into waveguide 770 as waveguide light 779. Dimension 724 in FIG. 7 may be approximately 10 microns, in some contexts. Tapered waveguide 770 is one way of incoupling a beam into a waveguide and other techniques may be employed to incouple light beams into a waveguide.

FIGS. 8A-8K illustrate an example fabrication process of an optical structure that increases light incoupling efficiency, in accordance with aspects of the disclosure. Advantageously, the illustrated fabrication process may be compatible with complementary metal-oxide semiconductor (CMOS) fabrication techniques to manufacture a monolithic PIC.

Figure 8A:
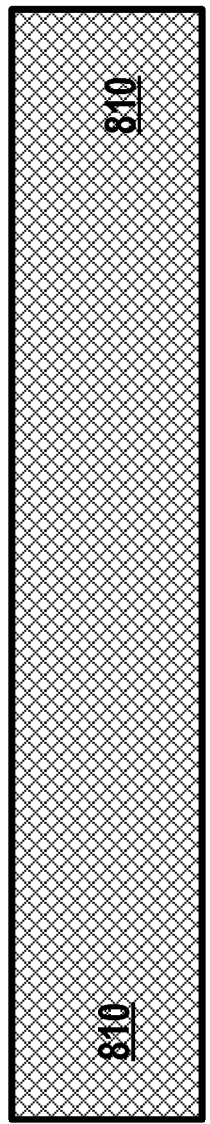

FIG. 8A illustrates an optical structure 800 having a substrate layer 810. Substrate layer 810 may be considered a wafer having a size (e.g. diameter) of four inches to twelve inches and a thickness of 100-1000 microns, for example. Multiple PICs may be fabricated on the same wafer, in some contexts. Substrate layer 810 may be made from silicon or glass, for example.

Figure 8B:
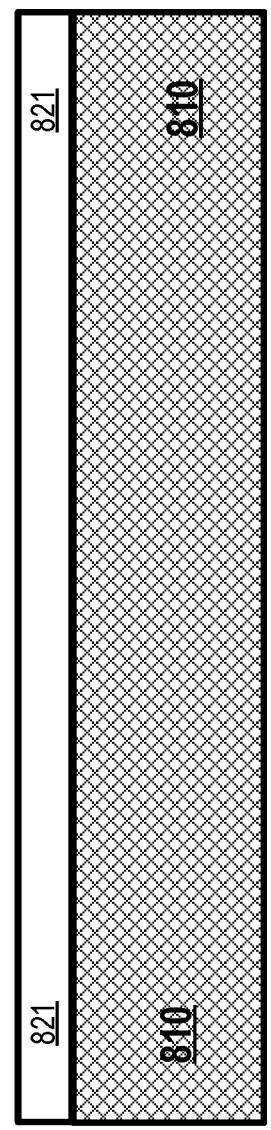

In the optical structure 800 of FIG. 8B, a portion of cladding layer 821 is disposed on substrate layer 810. Cladding layer 821 may be grown or deposited onto substrate layer 810, depending on the materials of cladding layer 821 and substrate layer 810. Cladding layer 821 may include silicon-oxide ($SiO_2$).

The optical structure 800 of FIG. 8C shows reflector layer 880 formed on cladding layer 821. Reflector layer 880 may be formed of a metal reflector layer. If reflector layer 880 is diffractive, layer 880 may be disposed on cladding layer 821 and a subtractive process (e.g. diamond turning or etching) may be used to form the diffractive structures in layer 880, for example. Alternatively, an additive CMOS process may be used to building a diffractive structure as reflective layer 880.

The optical structure 800 of FIG. 8D illustrates an additional portion of cladding layer 821 formed over reflector layer 880.

In the optical structure 800 of FIG. 8E, waveguide layer 870 is formed over cladding layer 821. Waveguide layer 870 may be formed of silicon-nitride, for example.

In FIG. 8F, light input coupler 872 is formed in waveguide layer 870. Forming light input coupler 872 may include a subtractive process (e.g. diamond turning or etching) to form nano-pillars for an input grating configured specifically to incouple the wavelength of light emitted by a particular light source (e.g. a VCSEL or LED). In an embodiment, layer 870 is a resin material having a refractive index that is imprinted to form light input coupler 872.

The optical structure 800 of FIG. 8G illustrates a remaining portion of cladding layer 821 deposited over waveguide layer 870 and filling in between the nano-pillars of grating 872.

FIG. 8H shows light director layer 830 formed on cladding layer 821 and formed over the waveguide layer 870. Light director layer 830 may be SiN. In some embodiments (not illustrated), an AR layer may be formed between cladding layer 821 and light director layer 830 to increase light propagation efficiency through a refractive light director layer 830.

Figure 8I:
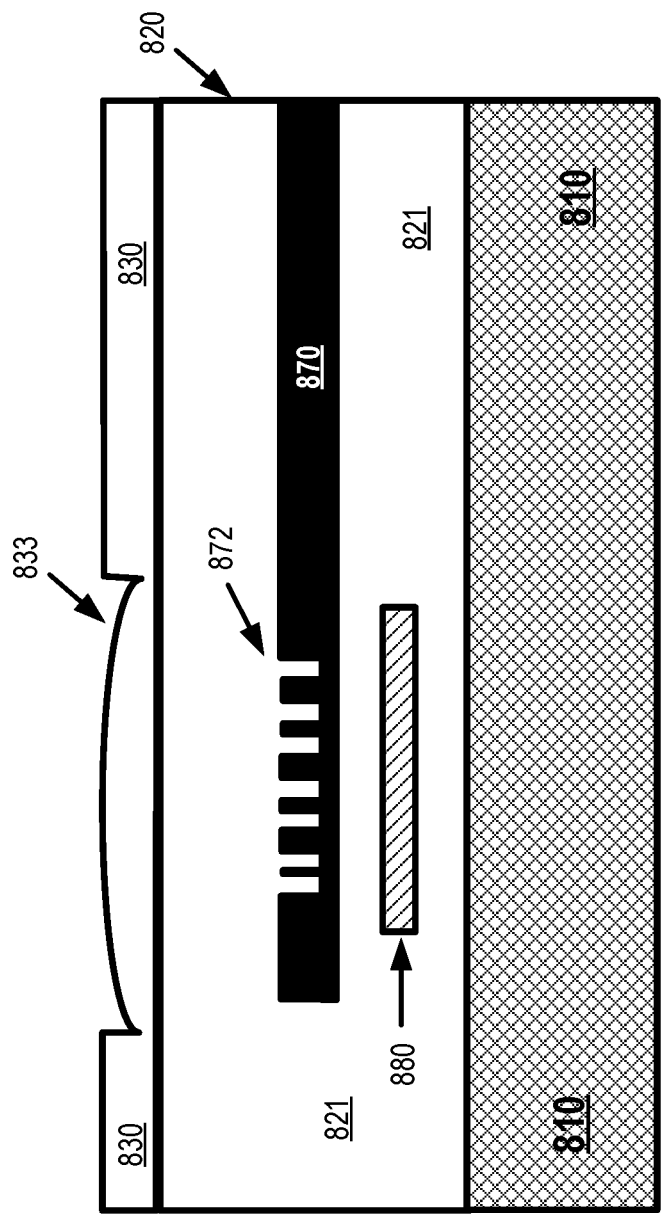

In FIG. 8I, microlens 833 has been formed from the light director layer 830. Microlens 833 may have the features of microlens 133, for example. Forming microlens 833 may include etching different depths using greytone lithography techniques to achieve the designed lensing surface of microlens 833. An AR layer may be formed over the lensing surface of microlens 833 to increase the transmission of incident light. When a metalens is used rather than refractive microlens 833, the metalens may be formed or placed over cladding layer 821 or the metalens may be formed into light director layer 830 in a subtractive process using known CMOS fabrication techniques. A metasurface of the metalens may be made of SiN and/or amorphous silicon, for example. The metasurface may include subwavelength nanostructures. Nanostructures such as nano-pillars having a same height but different diameter may be formed to generate a planar lens.

Figure 8J:
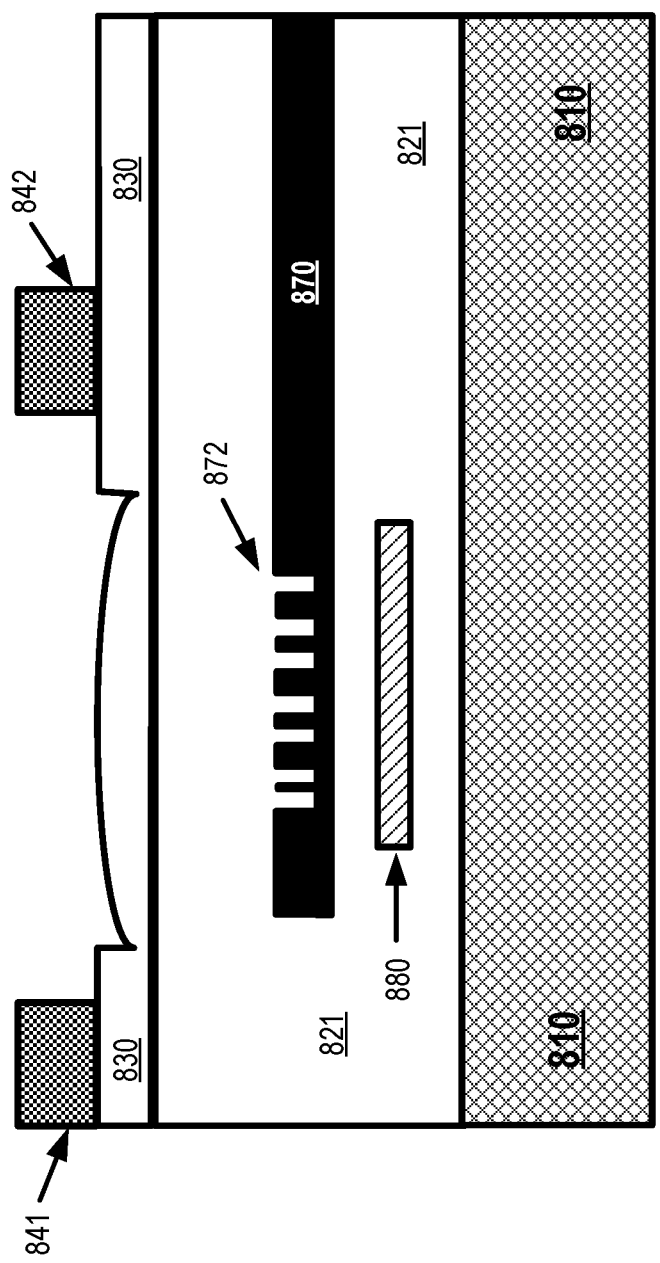

In FIG. 8J, electrical traces 841 and 842 are formed on optical structure 800. Traces 841 and 842 may be gold or copper and coupled to a transistor having a gate receiving an electrical signal that modulates the electrical current through a light source to be added to optical structure 800. Traces 841 and 842 may be considered contact pads to connect electrodes of a light source and may include multilayer metal structures to form the contact pads.

Figure 8K:
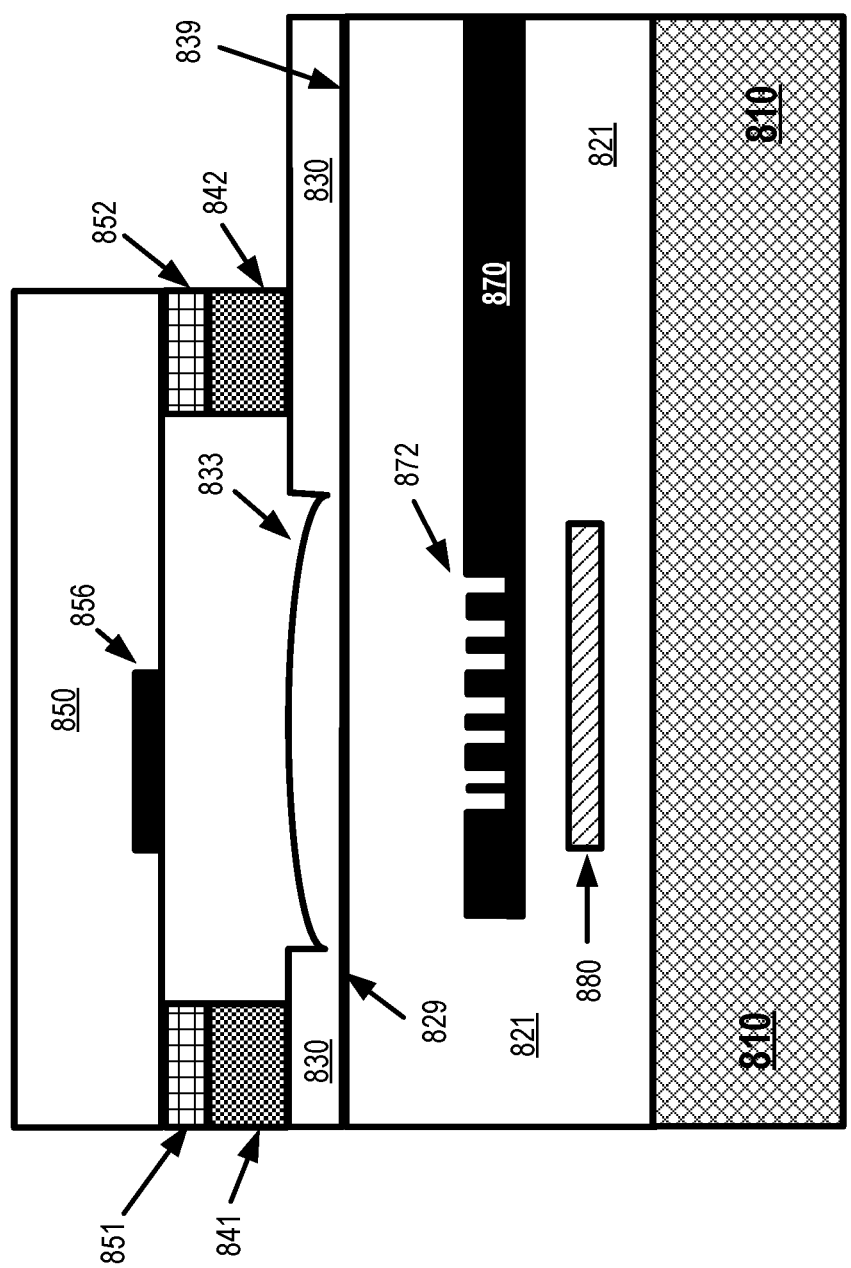

FIG. 8K illustrates light source 850 being coupled to traces 841 and 842. In particular, electrical contact 851 of light source 850 is coupled to trace 841 and electrical contact 852 of light source 850 is coupled to trace 842. Coupling light source 850 to traces 841 and 842 may include a pick-and-place machine placing light source 850 on traces 841 and 842 and allowing solder (not illustrated) to reflow to electrically couple to electrical contacts to the traces. Hence, optical structure 800 in FIG. 8K illustrates a device that may be fabricated using CMOS fabrication techniques that increases optical coupling efficiency for light sources into waveguides.

Figure 9:
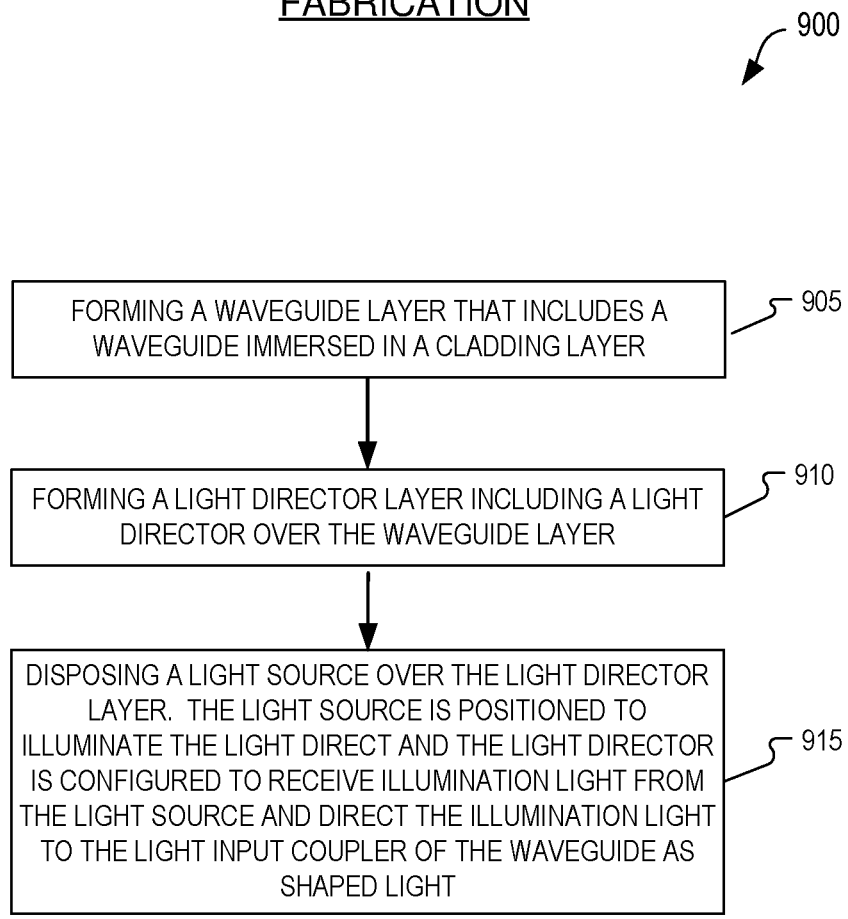
FIG. 9 illustrates a process of fabricating a photonic integrated circuit, in accordance with aspects of the disclosure.

FIG. 9 illustrates a process 900 of fabricating a photonic integrated circuit, in accordance with aspects of the disclosure. The order in which some or all of the process blocks appear in process 900 should not be deemed limiting. Rather, one of ordinary skill in the art having the benefit of the present disclosure will understand that some of the process blocks may be executed in a variety of orders not illustrated, or even in parallel.

In process block 905, a waveguide layer is formed. The waveguide layer include a waveguide (e.g. 870) immersed in in a cladding layer (e.g. 821). The waveguide includes a light input coupler (e.g. 872). In the context of FIG. 8K, the combination of cladding layer 821 and waveguide 820 may be considered the "waveguide layer" and reflector 880 may optionally be included in the waveguide layer. Waveguide layer 120 in FIG. 1A is also an example waveguide layer.

In process block 910, a light director layer is formed over the waveguide layer. The light director layer (e.g. 830) includes a light director. The light director may be a microlens or a metalens. A top plane of the waveguide layer is coupled with a bottom plane of the light director layer. For example, in the context of FIG. 8K, planar side 829 is a top plane of the waveguide layer and plane 839 is the bottom plane of light director layer 830.

In process block 915, a light source is disposed over the light director layer. The light source is positioned to illuminate the light director of the light director layer. The light director is configured to receive illumination light from the light source and direct the illumination light to the light input coupler as shaped light. The light director is configured to tilt the illumination light to give the shaped light a tilt angle with respect to the light input coupler.

Figure 10:
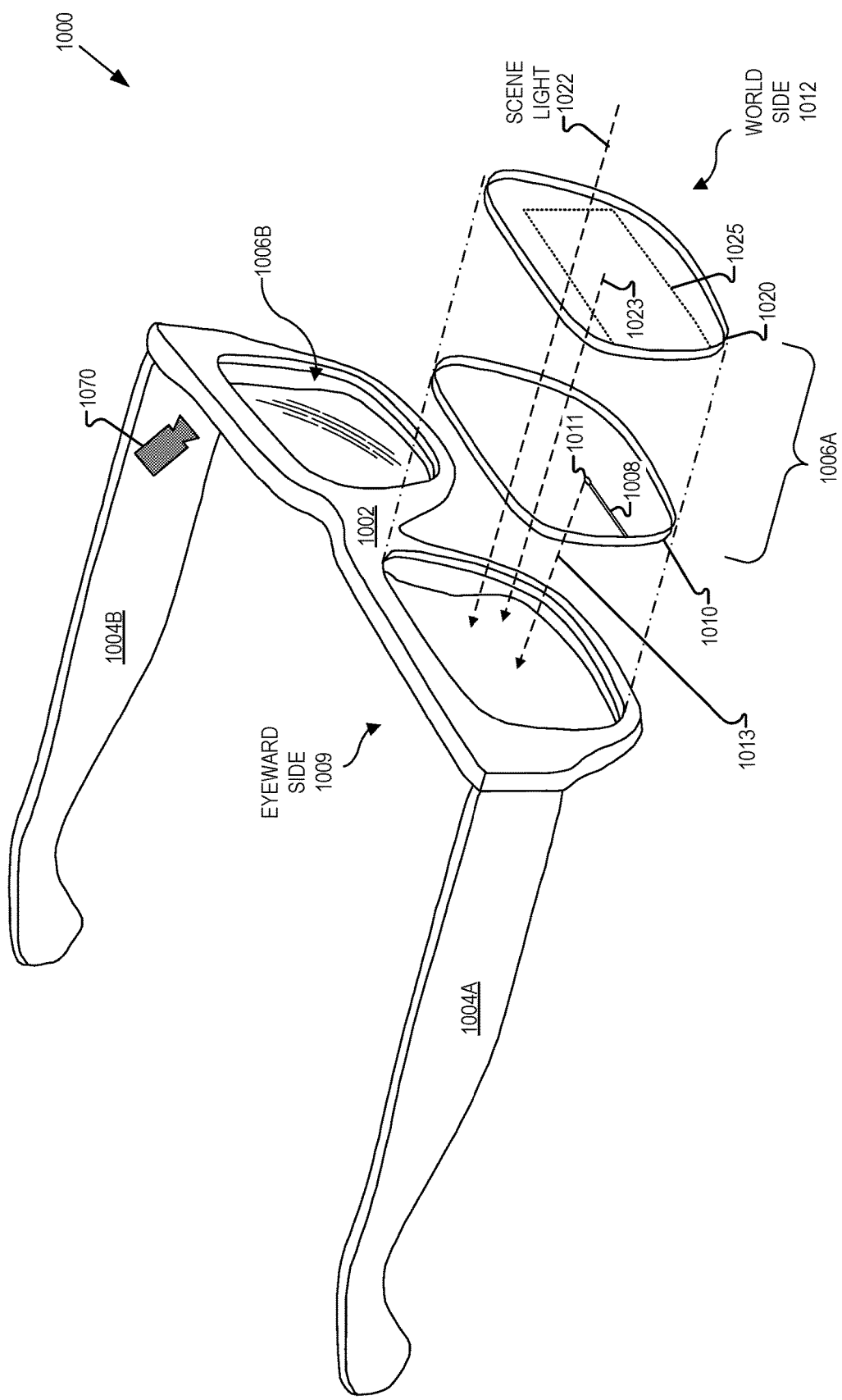
FIG. 10 illustrates an example head mounted device that may include photonic integrated circuits, in accordance with aspects of the disclosure.

FIG. 10 illustrates an example head mounted device 1000, in accordance with aspects of the present disclosure. The devices and fabrication techniques described in this disclosure may be used to provide certain components to head mounted device 1000. A head mounted device, such as head mounted device 1000, is one type of smart device. In some contexts, head mounted device 1000 is also a head mounted display (HMD). Artificial reality is a form of reality that has been adjusted in some manner before presentation to the user, which may include, e.g., virtual reality (VR), augmented reality (AR), mixed reality (MR), hybrid reality, or some combination and/or derivative thereof.

The illustrated example of head mounted device 1000 is shown as including a frame 1002, temple arms 1004A and 1004B, and a near-eye optical element 1006A and a near-eye optical element 1006B. FIG. 10 also illustrates an exploded view of an example of near-eye optical element 1006A. Near-eye optical element 1006A is shown as including an illumination layer 1010 and a display layer 1020.

As shown in FIG. 10, frame 1002 is coupled to temple arms 1004A and 1004B for securing the head mounted device 1000 to the head of a user. Example head mounted device 1000 may also include supporting hardware incorporated into the frame 1002 and/or temple arms 1004A and 1004B. The hardware of head mounted device 1000 may include any of processing logic, wired and/or wireless data interfaces for sending and receiving data, graphic processors, and one or more memories for storing data and computer-executable instructions. In one example, head mounted device 1000 may be configured to receive wired power and/or may be configured to be powered by one or more batteries. In addition, head mounted device 1000 may be configured to receive wired and/or wireless data including video data.

FIG. 10 illustrates near-eye optical elements 1006A and 1006B that are configured to be mounted to the frame 1002. The frame 1002 may house the near-eye optical elements 1006A and 1006B by surrounding at least a portion of a periphery of the near-eye optical elements 1006A and 1006B. The near-eye optical element 1006A is configured to receive visible scene light 1022 at a world side 1012 of the near-eye optical element 1006A. The visible scene light 1022 propagates through optical element 1006A to an eye of a user of the head mounted device on an eyeward side 1009 of optical element 1006A. In some examples, near-eye optical element 1006A may be transparent or semi-transparent to the user to facilitate augmented reality or mixed reality such that the user can view visible scene light 1022 from the environment while also receiving display light 1023 directed to their eye(s) by way of display layer 1020. A waveguide 1025 included in display layer 1020 may be utilized to direct the display light 1023 generated by an electronic display in an eyeward direction, although other display technologies may also be utilized in display layer 1020. In some implementations, at least a portion of an electronic display is included in the frame 1002 of the head mounted device 1000. The electronic display may include an LCD, an organic light emitting diode (OLED) display, micro-LED display, pico-projector, or liquid crystal on silicon (LCOS) display for generating the display light 1023.

In further examples, some or all of the near-eye optical elements 1006A and 1006B may be incorporated into a virtual reality headset where the transparent nature of the near-eye optical elements 1006A and 1006B allows the user to view an electronic display (e.g., a liquid crystal display (LCD), an organic light emitting diode (OLED) display, a micro-LED display, etc.) incorporated in the virtual reality headset. In this context, display layer 1020 may be replaced by the electronic display.

Illumination layer 1010 includes a transparent layer that may be formed of optical polymers, plastic, glasses, transparent wafers (such as high-purity semi-insulating SiC wafers) or any other transparent materials used for this purpose. A waveguide structure 1008 is configured to receive non-visible light (e.g. near-infrared light) from a non-visible light source. Hence, the devices and fabrication techniques described with respect to FIGS. 1A-9 may be utilized in illumination layer 1010 to efficiently incouple light from a light source to a waveguide structure 1008. Waveguide structure 1008 is configured to deliver the non-visible light from the non-visible light source to outcoupling element 1011, in FIG. 10. Only one waveguide structure 1008 and one outcoupling element 1011 are illustrated in FIG. 10, although there may be a plurality of outcoupling elements in some implementations. Furthermore, multiple light sources, and multiple waveguides may be included in a PIC that is include in illumination layer 1010. The one or more outcoupling elements 1011 are configured to outcouple the non-visible light propagating in waveguide structure 1008 as non-visible illumination light 1013 to illuminate an eye region.

The non-visible illumination light 1013 may be near-infrared light, in some aspects. The non-visible light source that generates the non-visible light for waveguide structure 1008 may include one or more of light emitting diode (LED), a micro light emitting diode (micro-LED), an edge emitting LED, a vertical cavity surface emitting laser (VCSEL), on-chip integrated laser, hybrid integrated laser, or a Superluminescent diode (S-LED). Depending on the architecture, a single light source or a light source array can be used. When a single light source is used, waveguide splitters can be used to distribute the light into multiple outputs. The light source may be buried in the frame so that is out of a FOV (field of view) of a user. When an array of light sources is used, each light source can supply one output so that no waveguide splitter is needed. A waveguide splitter may be used to split the power in one waveguide into multiple waveguides. For example, a Y shaped splitter can divide a single waveguide into two channels with balanced power or designed unbalanced power. A 1×2 MMI (multimode interferometer) coupler can function similarly to a Y splitter, a 1×4 MMI splitter can divide a single waveguide into 4 channels, and so on. A Mach-Zehnder interferometer can also be used for splitting optical power of a waveguide.

In some implementations, a combiner layer (not illustrated) is optionally disposed between display layer 1020 and illumination layer 1010 to direct reflected non-visible illumination light that has reflected from an eye region to a camera (e.g. camera 1070) to capture eye-tracking images. In some implementations, camera 1070 is positioned to image the eye directly by imaging the reflected non-visible illumination light reflecting from the eye region. Camera 1070 may include a CMOS image sensor. When non-visible illumination light 1013 is infrared light, an infrared filter that receives a narrow-band infrared wavelength may be placed over the image sensor so it is sensitive to the narrow-band infrared wavelength while rejecting wavelengths outside the narrow-band, including visible light wavelengths.

As shown in FIG. 10, outcoupling element 1011 and waveguide structure 1008 are disposed within the field-of-view (FOV) of a user provided by the near-eye optical element 1006A. While outcoupling element 1011 may introduce minor occlusions or non-uniformities into the near-eye optical element 1006A, outcoupling element(s) 1011 and waveguide structure 1008 may be so small as to be unnoticeable or insignificant to a wearer of head mounted device 1000. Additionally, any occlusion from outcoupling element 1011 and waveguide structure 1008 may be placed so close to the eye as to be unfocusable by the human eye and therefore outcoupling element 1011 and waveguide structure 1008 will not be noticeable to a user of device 1000. Waveguide structure 1008 includes a transparent (to visible light) dielectric material, in some implementations. Furthermore, outcoupling element 1011 and waveguide structure 1008 may be so small that even an observer (a person not wearing device 1000 but viewing device 1000) may not notice outcoupling element 1011 and waveguide structure 1008. Outcoupling element 1011 may be smaller than 75 microns at it widest/longest dimension. In an implementation, outcoupling element 1011 may be smaller than 20 microns at its widest/longest dimension and waveguide structure 1008 may be approximately 1-10 microns wide and formed with transparent materials. Waveguide structure 1008 may be approximately 100 nm to 1 micron, in some implementations. Outcoupling element 1011 may be approximately 10 microns at its widest/longest dimension, in some implementations. In contrast, actual light sources positioned in illumination layer 1010 would have a footprint of approximately 100×100 microns or larger.

In some implementations, optical element 1006A may have a curvature for focusing light (e.g., display light 1023) to the eye of the user. The curvature may be included in the transparent layer of illumination layer 1010. Thus, optical element 1006A may be referred to as a lens. In some aspects, optical element 1006A may have a thickness and/or curvature that corresponds to the specifications of a user. In other words, optical element 1006A may be considered a prescription lens.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device may include a desktop computer, a laptop computer, a tablet, a phablet, a smartphone, a feature phone, a server computer, or otherwise. A server computer may be located remotely in a data center or be stored locally.

The processes explained above may be implemented with computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A device comprising:
   a light source configured to emit illumination light, wherein the light source includes:
   a first electrical contact; and
   a second electrical contact, wherein the first electrical contact and the second electrical contact are configured for electrically coupling the light source to power, and wherein the first electrical contact is coplanar with the second electrical contact;
   an optical waveguide having a light input coupler; and
   a light director to receive the illumination light and direct the illumination light to the light input coupler of the optical waveguide as shaped light, wherein the light director is configured to tilt the illumination light to give the shaped light a tilt angle with respect to the light input coupler.

2. The device of claim 1, wherein the light director is configured to give the shaped light a smaller divergence angle than an illumination light divergence angle of the illumination light.

3. The device of claim 2, wherein the smaller divergence angle of the shaped light is less than ten degrees of divergence.

4. The device of claim 1, wherein the tilt angle is measured with respect to a vector orthogonal to a plane of the optical waveguide, and wherein the tilt angle is between three degrees and fifteen degrees.

5. The device of claim 1, wherein the illumination light and the shaped light is infrared light.

6. The device of claim 1 further comprising:
a refractive cladding layer, wherein the optical waveguide is immersed in the refractive cladding layer, and wherein the shaped light propagates through the refractive cladding layer prior to becoming incident on the light input coupler.

7. The device of claim 6, wherein the light director is disposed on the refractive cladding layer and spaced apart from the light source.

8. The device of claim 1, wherein the light director is coupled with an emission aperture of the light source, wherein the light director is configured to give the shaped light a smaller divergence angle than would be emitted in the illumination light of the light source.

9. The device of claim 1, wherein the light director is a refractive microlens.

10. The device of claim 9, wherein the refractive microlens includes an anti-reflection (AR) coating disposed on an input side of the refractive microlens that receives the illumination light.

11. The device of claim 1, wherein the light director is one of a diffractive optical element or a metalens formed by a metasurface with subwavelength nano structures.

12. The device of claim 1, wherein the light director includes a refractive wedge optic configured to impart the tilt angle to the shaped light.

13. The device of claim 1 further comprising:
a diffractive reflector layer, wherein the light input coupler is disposed between the diffractive reflector layer and the light director, and wherein the diffractive reflective layer is specifically configured to reflect an infrared wavelength band of the illumination light back to the light input coupler, and wherein the diffractive reflective layer is configured to transmit light outside of the infrared wavelength band.

14. The device of claim 1, wherein the light input coupler includes a grating.

15. The device of claim 1 further comprising:
a refractive spacing layer disposed between the light director and the light source, wherein a top plane of the refractive spacing layer is parallel to an emission aperture of the light source.

16. The device of claim 1, wherein the light director includes a refractive microlens, and wherein an emission aperture of the light source is offset from a central optical axis of the refractive microlens to impart the tilt angle of the shaped light.

17. A method of fabricating a photonic integrated circuit, the method comprising:
forming a waveguide layer that includes a waveguide immersed in a cladding layer, wherein the waveguide includes a light input coupler;
forming a light director layer including a light director over the waveguide layer, wherein a top plane of the waveguide layer is coupled with a bottom plane of the light director layer; and
disposing a light source over the light director layer, wherein the light source includes coplanar electrical contacts configured to electrically couple the light source to power to illuminate the light director, and wherein the light director is configured to receive illumination light from the light source and direct the illumination light to the light input coupler as shaped light, wherein the light director is configured to tilt the illumination light to give the shaped light a tilt angle with respect to the light input coupler.

18. The device of claim 1, wherein the first electrical contact and the second electrical contact of the light source are parallel to a top plane of the optical waveguide.

19. The method of claim 17, wherein the coplanar electrical contacts are parallel to the top plane of the optical waveguide.

* * * * *